March 6, 1945.　　　　E. A. RATHGEN　　　　2,370,993
ROTARY SHEAR
Filed Sept. 17, 1943　　　　2 Sheets-Sheet 1
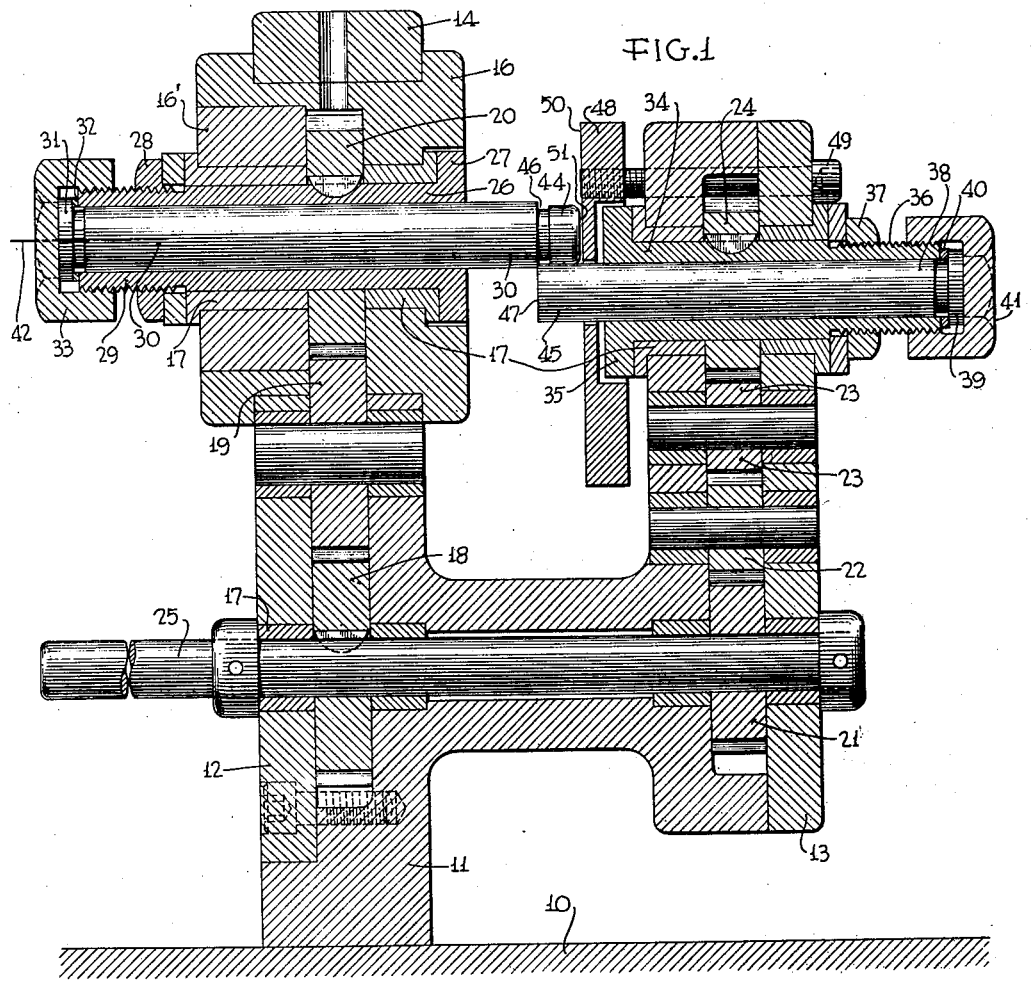
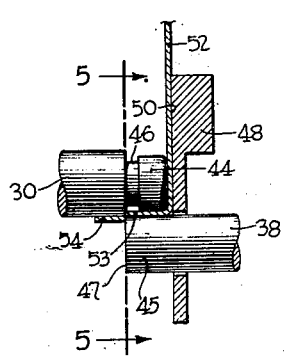
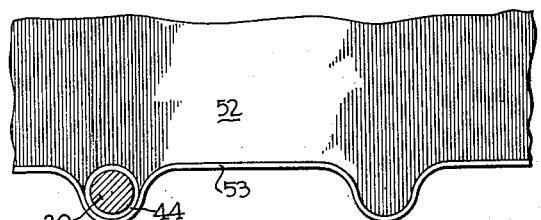
INVENTOR
Ewalt A. Rathgen
BY John P. Tarbot
ATTORNEY March 6, 1945.  E. A. RATHGEN  2,370,993
ROTARY SHEAR
Filed Sept. 17, 1943   2 Sheets-Sheet 2
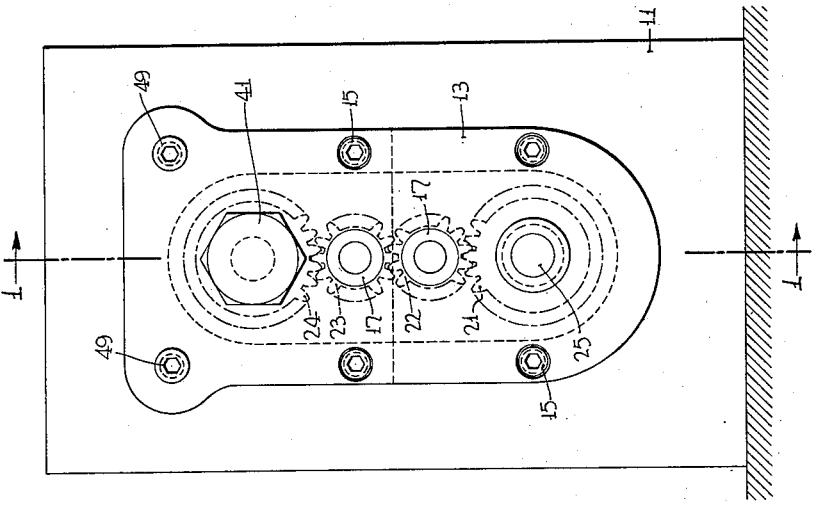
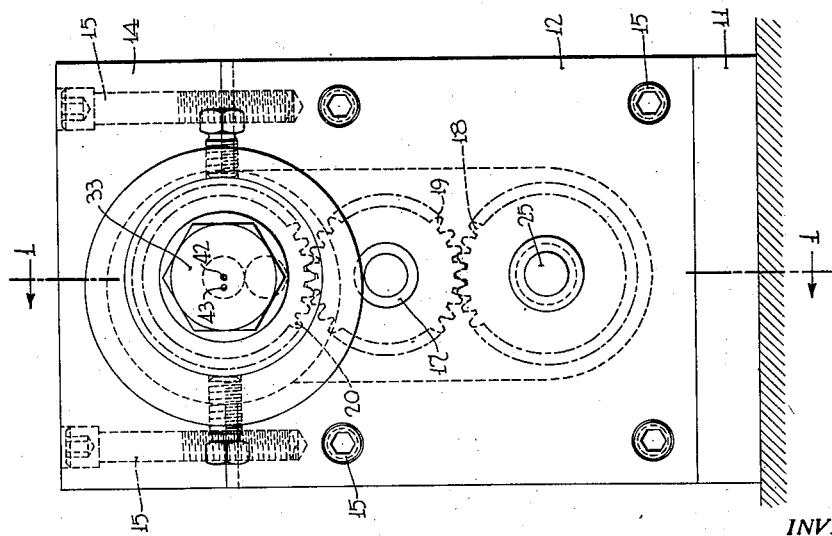
INVENTOR
Ewalt A. Rathgen.
BY John P. Tarbot
ATTORNEY Patented Mar. 6, 1945

2,370,993

UNITED STATES PATENT OFFICE 2,370,993

ROTARY SHEAR

Ewalt A. Rathgen, Philadelphia, Pa., assignor to Edward G. Budd Manufacturing Company, Philadelphia, Pa., a corporation of Pennsylvania Application September 17, 1943, Serial No. 502,722

11 Claims. (Cl. 164—63)

The invention refers to a shear of the type having two driven disc-formed shear members between which the work is passed.

The object of the invention is a machine of the indicated type which permits the trimming of flanges on workpieces of such shape and construction that it had hitherto to be done by tediously inscribing the trim line on the workpiece and then trimming it by a hand shear or by guiding it by hand through an ordinary rotary shear.

The aforesaid object and other objects are achieved by the new arrangement and form of the shearing members and by guiding means for the work. The features of the invention will be more easily understood from the attached drawings showing an embodiment of the invention and from the following description thereof:

In the drawings,

Figure 1 is a vertical section through the new shear along lines 1—1 of Figures 2 and 3;

Figure 2 is a rear elevation of the machine;

Figure 3 is a front elevation of the machine;

Figure 4 is a fragmentary section similar to part of Figure 1, yet on a larger scale and with a workpiece between the shear members; and Figure 5 is a section along line 5—5 of Figure 4.

Firmly secured to a suitable base 10 is a bifurcated supporting structure, such as a casting or the like, 11. Secured to the arms of this supporting structure 11 are a rear plate 12, a front plate 13, and a top member 14 by means of screw bolts 15. Supported in the circular opening formed between the members 11, 12 on the one hand and the member 14 on the other hand is a two-part bearing 16, 16'.

The members 11, 12, 13, 16 and 16' are provided with bushings 17 for two trains of gears 18, 19, 20 and 21, 22, 23, 24, one in each arm of the supporting structure.

The gears 18 and 21 are keyed to a shaft 25 which is driven from an appropriate source of power, such as an electric motor (not shown).

Gear 20 is keyed to a bushing 26 which is held against axial displacement by its shoulder 27 and a nut 28 screwed onto its screw threaded rear end 29. Located in the bushing 26 is a shaft 30. The rear end of the shaft 30 has a shoulder 31 which rests against the end of the sleeve 26 by means of shims 32. Sleeve 26 and shaft 30 are firmly pressed against each other by means of a cap nut 33 screwed on the screw threaded end 29 of the sleeve 26 so that these members will rotate together. By selecting the thickness of the shims 32, the position of the shaft 30 with respect to the sleeve 26 may be adjusted within certain limits for the purpose which will be described later on.

In the same manner and for the same purposes as gear 20, the gear 24 is keyed to a sleeve 34 provided with a shoulder 35, a screw threaded opposite end 36, a nut 37, an interior shaft 38, a shoulder 39 on the latter, shims 40, and a cap nut 41.

The common axis 42 of gear 20, its sleeve 26 and shaft 30 is located eccentrically to the axis 43 of the circular supporting surfaces of the bearing 16, 16' and the supporting structure 11, 14. This permits adjustment of the location of the axis 42 within certain limits by turning the bearing 16, 16' relative to the structure 11, 14.

The ends 44, 45 of the shafts 30, 38 overlap one another for a short distance. The end 44 of the shaft 30 is of somewhat smaller diameter than the main portion of the shaft and is separated from the latter by a groove 46. The edge between the groove 46 and the main portion of the shaft forms a cutting edge. The end 45 of the shaft 38 is straight cylindrical, and the edge between its end surface 47 and the cylindrical surface forms the cutting edge of the other shear tool. The shafts 30, 38, or at least their overlapping ends, consist of tool steel and are hardened.

The two shafts or tools 30, 38 are adjusted by the proper choice of the shims 32, 40 so that their cutting edges engage one another as shown in Figures 1 and 4.

Depending on the thickness of the workpiece, the ends of the shafts are slightly removed from one another transversely to their axial direction by turning the bearing 16, 16'.

A guide member 48 surrounding end 45 of shaft 38 is supported from the structure 11, 13 by screw bolts 49 adjustably in the axial direction of the shaft 38 so that a space corresponding to the thickness of a given workpiece can be provided between the face 50 of the member 48 and the end face 51 of the tool 30. The edge of face 51 is rounded off.

For trimming a workpiece 52 having a flange 53 of the configuration shown in Figures 4 and 5, shafts 30, 38 with appropriately shaped tool heads are inserted and they as well as the guide 48 are properly adjusted by the hereinbefore described means. Then a workpiece 52 is introduced with its flange 53 between the driven tool heads 44, 45 and with its body between the head 44 and the guide 48. The rotating tools engage the flange 53, carry it along, and their cutting edges trim off its edge 54.

On account of the small diameter of the cutting tools, it is possible to trim flanges having rather sharp bends, offsets or the like, as indicated in Figure 5. After the initial insertion of the workpiece, the latter is taken along automatically and the flange is trimmed to a constant width without requiring any special care by the workman.

The machine is, of course, liable to many modifications within the basic concept of the invention. All such modifications or adaptations for special requirements are intended to be covered by the attached claims.

What is claimed is:

1. Shear comprising two driven rotary shear rollers supported on opposite sides in a supporting structure, said rollers having substantially cylindrical form and such small diameter as to adapt it for cutting webs provided with curves of small radii.

2. Shear comprising two rotary shear rollers supported on opposite sides in a supporting structure, and means for rotating said rollers, the rollers overlapping one another for a short distance, the overlapping end of the one roller having a smaller diameter than its adjoining portion so as to form a cutting edge intermediate the length of this roller, the end of smaller diameter of the one roller being adapted for guiding a workpiece between it and the other roller while the circumferential portion adjoining the overlapping end of smaller diameter is out of contact with the other roller.

3. Shear according to claim 2, the one roller only having its cutting edge at a distance from its end and the other roller having its cutting edge at its end.

4. Shear comprising two rotary shear rollers rotatably arranged in a supporting structure, the rollers overlapping one another for a short distance so as to transport the work between the overlapping portions incident to the rotation of the rollers, the overlapping end of the one roller having a smaller diameter than its adjoining portion so as to form a cutting edge intermediate the length of this roller, said adjoining portion having its circumferential surface out of contact with the other roller.

5. Shear comprising two rotatable shear rollers supported on opposite sides in a supporting structure, means for rotating said rollers, the rollers overlapping one another for a short distance and having their cutting edges at a distance from the end of at least one of said rollers, and a stationary guide member attached to said supporting structure opposite the end of the roller having the cutting edge at a distance therefrom.

6. Shear comprising two rotatable shear rollers supported on opposite sides in a supporting structure, means for rotating said rollers, the rollers overlapping one another for a short distance and having their cutting edges at a distance from at least one of said rollers, and a stationary guide member adjustably attached to said supporting structure opposite the end of the roller having the cutting edge at a distance therefrom.

7. Shear comprising two rotary shear rollers supported on opposite sides in a supporting structure, and means for rotating said rollers, the rollers overlapping one another for a short distance, the overlapping end of the one roller having a smaller diameter than its adjoining portion so as to form a cutting edge intermediate the length of this roller, the end of smaller diameter of the one roller being adapted for guiding a workpiece between the two rollers, and a stationary guide member adjustably attached to the supporting structure opposite the roller with the end of reduced diameter.

8. Shear comprising two rotary shear rollers of small diameter, a machine frame having two spaced arms, a member of a diameter larger than said shear rollers being rotatably supported in each of said arms and carrying one of said rollers each, said rollers extending from said arms in opposite directions into the space between the arms of the machine frame, means for driving said members.

9. In a rotary shear, a shear roller of small diameter substantially in the form of an elongated shaft, a bushing adapted for receiving said shaft and for being rigidly secured thereto, a machine frame, means for rotatably supporting said bushing in the frame and for driving it.

10. In a shear according to claim 9, said roller extending completely through said bushing and the means for securing the bushing to the roller being arranged at least in part on the end opposite the cutting end of the roller.

11. Shear according to claim 2 having its supporting structure in the form of a U and one of the rollers arranged in each of the arms of the U such that their overlapping ends project into the space between the two arms, the roller having the end of smaller diameter being arranged outwardly of the other roller with respect to the cross member of the U.

EWALT A. RATHGEN.